(12) United States Patent
Levner et al.

(10) Patent No.: US 7,907,844 B2
(45) Date of Patent: Mar. 15, 2011

(54) METHOD AND APPARATUS FOR HITLESS ROUTING OF OPTICAL SIGNALS IN AN OPTICAL TRANSPORT NETWORK

(75) Inventors: Daniel Levner, Toronto (CA); Francois Boudreault, Ottawa (CA); Hanan Anis, Kanata (CA)

(73) Assignee: University of Ottawa, Ottawa, Ontario (CA)

( * ) Notice: Subject to any disclaimer, the term of this patent is extended or adjusted under 35 U.S.C. 154(b) by 604 days.

(21) Appl. No.: 11/977,481

(22) Filed: Oct. 25, 2007

(65) Prior Publication Data

US 2009/0110396 A1    Apr. 30, 2009

(51) Int. Cl.
 *H04J 14/02*    (2006.01)
(52) U.S. Cl. .............................. 398/82; 398/84; 398/87
(58) Field of Classification Search ............... 398/79, 398/81, 82, 84, 87
 See application file for complete search history.

(56) References Cited

U.S. PATENT DOCUMENTS

| 6,768,872 B1 * | 7/2004 | Tsuritani et al. ............... 398/81 |
| 7,221,821 B2 * | 5/2007 | Eldada ............................ 385/24 |
| 2003/0026529 A1 * | 2/2003 | Durkin et al. .................. 385/24 |
| 2003/0174949 A1 * | 9/2003 | Bhardwaj et al. ............... 385/37 |

* cited by examiner

*Primary Examiner* — Dalzid Singh
(74) *Attorney, Agent, or Firm* — Harness, Dickey & Pierce PLC

(57) ABSTRACT

A method is provided for routing optical signals in an optical transport network. The method includes: separating an incoming optical multiplexed signal having a plurality of wavelength-channels embodied therein into two or more channel groups, where each channel group has a subset of the wavelength-channels and channels to be routed hitlessly in a given channel group are adjacent to a channel free region; providing a wavelength selective element for each wavelength-channel to be routed hitlessly; and routing a given wavelength-channel by tuning the corresponding wavelength selective element to either the given wavelength-channel or a channel free region adjacent to the given wavelength-channel. Providing a channel free region next to each channel to be routed allows the use of inexpensive tunable elements, which typically cause hits as they tune, to effect hitless routing.

22 Claims, 5 Drawing Sheets

US 7,907,844 B2

METHOD AND APPARATUS FOR HITLESS ROUTING OF OPTICAL SIGNALS IN AN OPTICAL TRANSPORT NETWORK

FIELD

The present disclosure relates to a method and apparatus for hitless routing of optical signals in an optical transport network.

BACKGROUND

Reconfigurability is important in optical networks, as it makes it possible to allocate bandwidth where it is needed. This flexibility is all the more crucial as you move closer to the end user because it allows service providers to offer bandwidth hungry services and generate more revenues from its end users. The reconfigurable optical add/drop multiplexer (ROADM) is the device that enables the infrastructure to be flexible. Existing technologies behind current ROADMs are much too expensive, making them not economically viable for applications in metro-edge and access networks.

Lower-cost ROADM technologies have been proposed, but they do not operate hitlessly. Hitless operation is a common requirement in optical communication components and refers to the quality that changing the state of one channel (add, dropping or passing it) should not affect communication traffic in any other wavelength-channel, even momentarily. Therefore, it is desirable to develop a low cost solution for routing optical signals without disturbing optical signals in other channels.

The statements in this section merely provide background information related to the present disclosure and may not constitute prior art.

SUMMARY

A method is provided for hitlessly routing optical signals in an optical transport network. The method includes: separating an incoming optical multiplexed signal having a plurality of wavelength-channels embodied therein into two or more channel groups, where each channel group has a subset of the wavelength-channels and channels to be routed hitlessly in a given channel group are adjacent to a channel free region; providing a wavelength selective element for each wavelength-channel to be routed hitlessly; and routing a given wavelength-channel by tuning the corresponding wavelength selective element to either the given wavelength-channel or a channel free region adjacent to the given wavelength-channel. Providing a channel free region next to each channel to be routed allows the use of inexpensive tunable elements, which typically cause hits as they tune, to effect hitless routing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
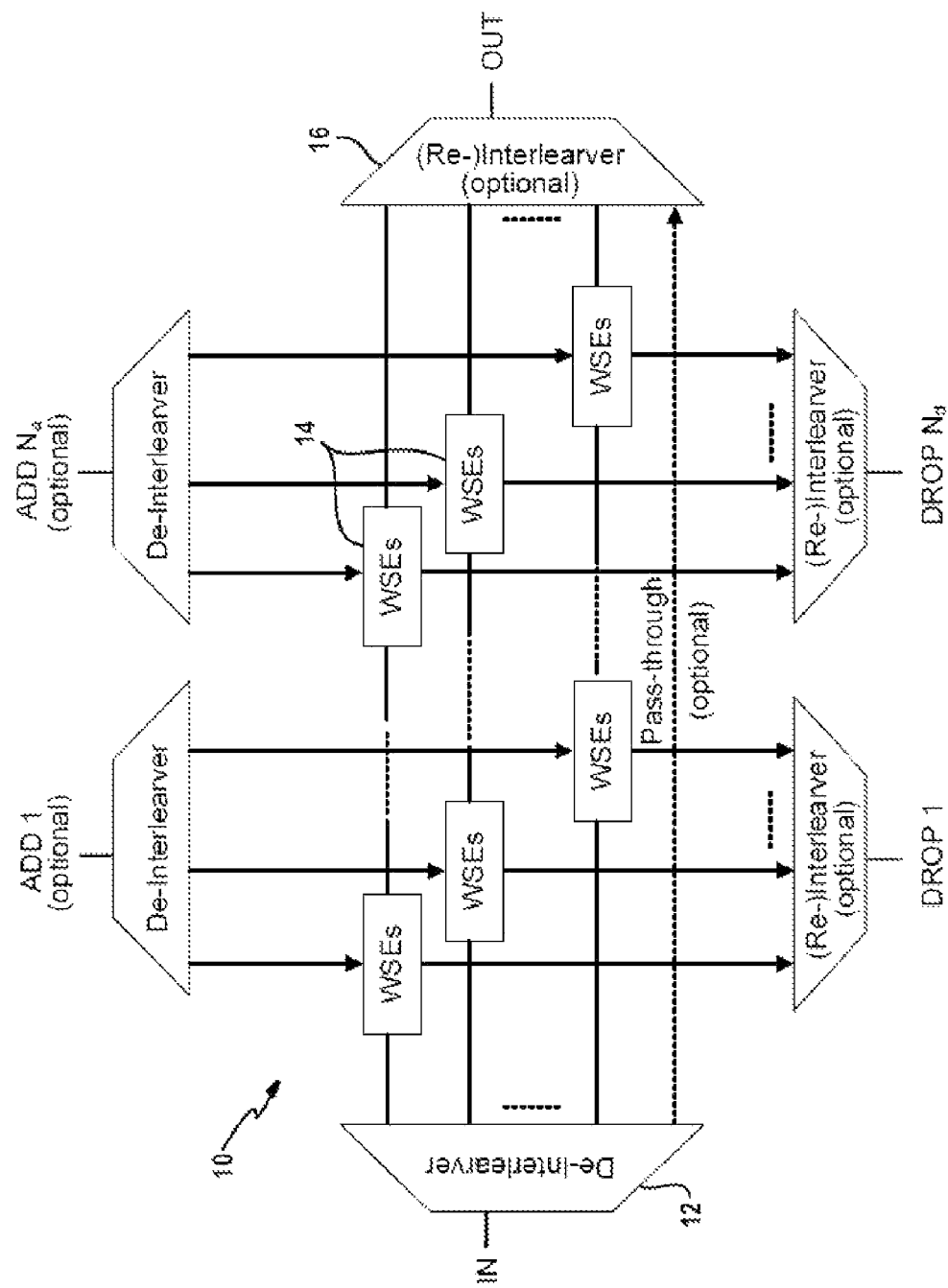
FIG. 1 is a diagram of an exemplary reconfigurable optical add/drop multiplexer (ROADM) according to the present disclosure.

FIG. 1 illustrates an exemplary reconfigurable optical add/drop multiplexer 10 (ROADM) according to the present disclosure. The reconfigurable multiplexer 10 is generally comprised of an optical de-interleaver 12 and a plurality of wavelength-selective elements 14 (WSE). The reconfigurable multiplexer may also include one or more interleavers 16. While the following description is provided with reference to an ROADM, it is readily understood that the inventive concepts are applicable to other types of optical routing devices.

The optical de-interleaver 12 is configured with at least one input port to receive an incoming optical multiplexed signal having a plurality of optical wavelength-channels embodied therein. A wavelength channel is understood to be an allocation of a certain wavelength range to a specific communication channel, whether the range contains an optical signal or not. The optical de-interleaver separates the optical multiplexed signal into two or more channel groups, where each channel group has a subset of the wavelength-channels found in the incoming signal.

De-interleaver commonly refers to a device that separates every $N^{th}$ channel, such that each channel signal in a given routing signal is adjacent to a channel signal that is not in the given routing signal. For purposes of this disclosure, a de-interleaver more generally refers to a device that separates channels such that channels to be routed are adjacent to a channel free region in their respective channel groups. In other words, not every channel in a channel group must have an empty channel next to it, but rather those channels that can be routed hitlessly.

Figure 2:
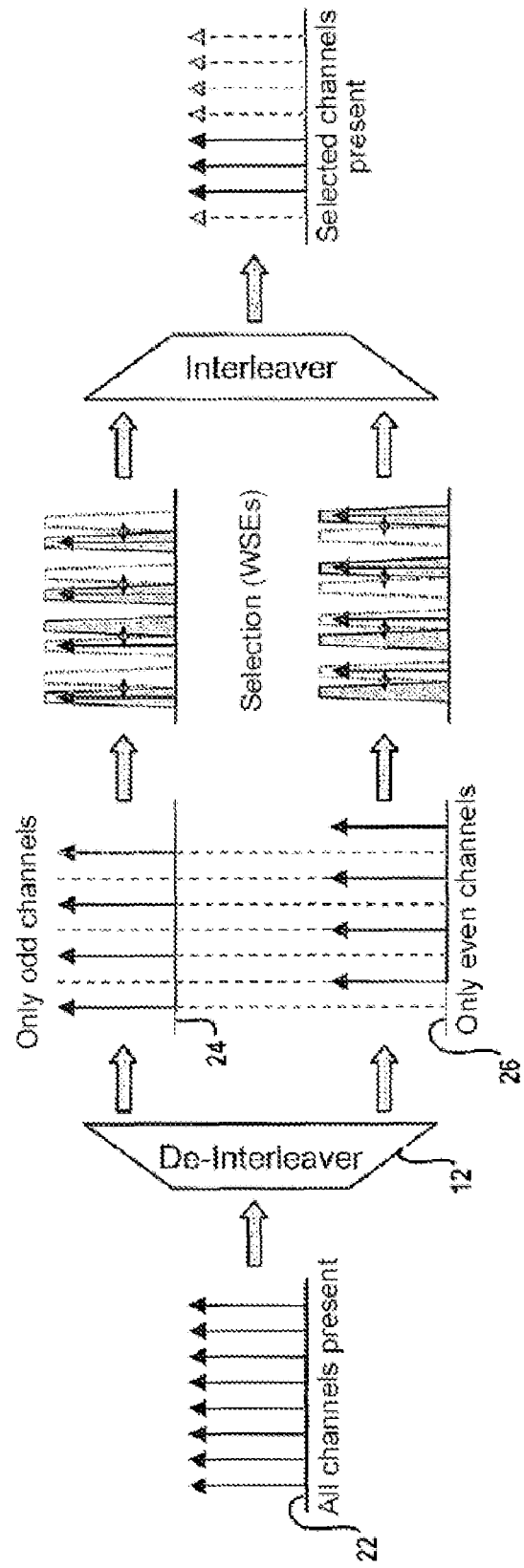
FIG. 2 is a diagram illustrating the principle of operation according to the present disclosure.

In an exemplary embodiment, the optical de-interleaver separates the optical multiplexed signal 22 into two channel groups: one signal 24 containing odd channels and one signal 26 containing even channels as shown in FIG. 2. Each channel in the channel group has an "empty" slot on either side which permits hitless tuning in the manner further described below. It is readily understood that an optical multiplexed signal may be partitioned into more than two channel groups. The number of channel groups a channel space can be divided can depend, for example, on the quality of the grating, the wavelength spacing, propagation loss, and other specifications. For example, partitioning 16 wavelength-channels into two groups of 8 can yield propagation losses corresponding to 8 wavelength-selective elements in series. In turn, partitioning the same 16 wavelength-channels into four groups of 4 channels can yield propagation losses corresponding to only 4 wavelength-selective elements in series. This potential for savings in propagation loss is offset by the rise in propagation loss associated with the increased complexity of the four-partition de-interleaver, which typically requires at least one additional stage compared to the two-partition case.

Figure 3:
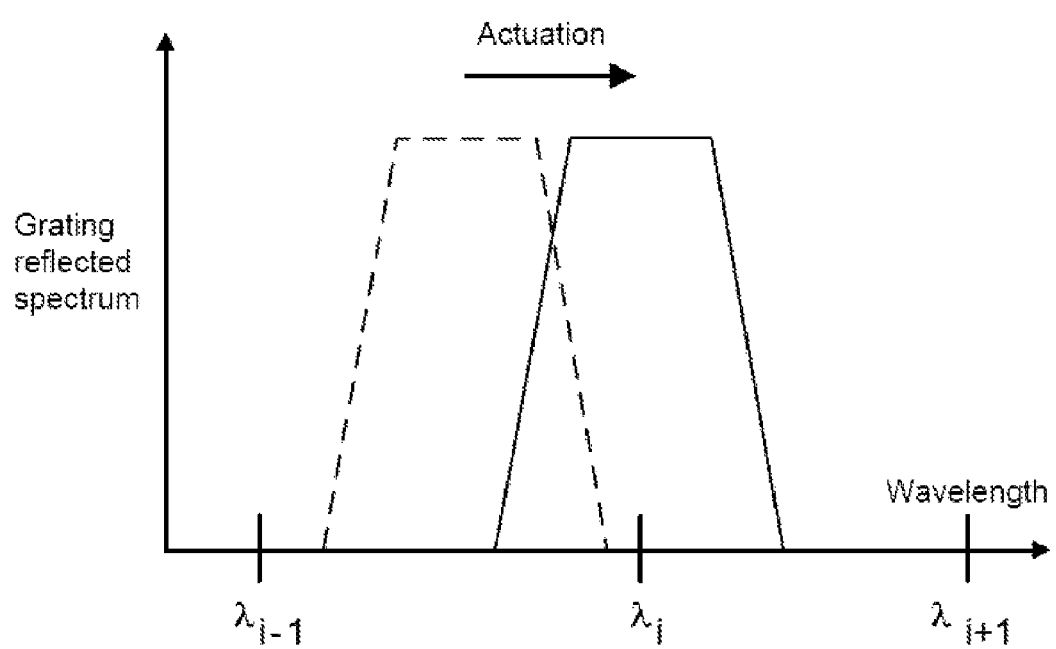
FIG. 3 is a diagram illustrating tuning method of a wavelength selective element according to the present disclosure.

Wavelength-selective elements are provided for each channel of interest in a given channel group. Tuning methods suitable for low-cost devices typically enable a small shift in a wavelength-selective element's stop-band as shown in FIG. 3. This Figure refers to a particular embodiment using reflective gratings, wherein tuning to the channel of interest ($\lambda_i$) reflects the channel. However, due to the de-interleaving, each channel signal has at least one empty channel next to it. Tuning the stop-band to an empty channel permits the channel of interest to pass without disturbing other channels in the channel group. Consequently, tuning only needs to be sufficient to shift: the wavelength-selective element's spectrum by one channel to select or unselect a particular channel. This approach not only reduces the required tuning effort but also has the benefit of making the device hitless.

With reference to FIG. 1, the reconfigurable multiplexer 10 can accommodate an arbitrary number of add or drop ports. In an exemplary embodiment, a plurality of wavelength selective elements are arranged in series for each channel group. Each wavelength selective element is operable to tune to a given channel signal of interest contained in the given channel group or to a channel adjacent to the channel signal of interest without disturbing any other wavelength-channels in the given channel group. By providing a wavelength selective element for each channel contained in the routing signal, any channel may be added, dropped or otherwise routed by the multiplexer. One or more channel groups may also bypass the wavelength selective elements, thereby acting as pass-thru channels. For subsequent routing, select channel groups (including pass-thru channels) may be optionally interleaved or remain separated. Likewise, channel groups being dropped may be optionally interleaved or remain separated for subsequent routing.

Figure 4:
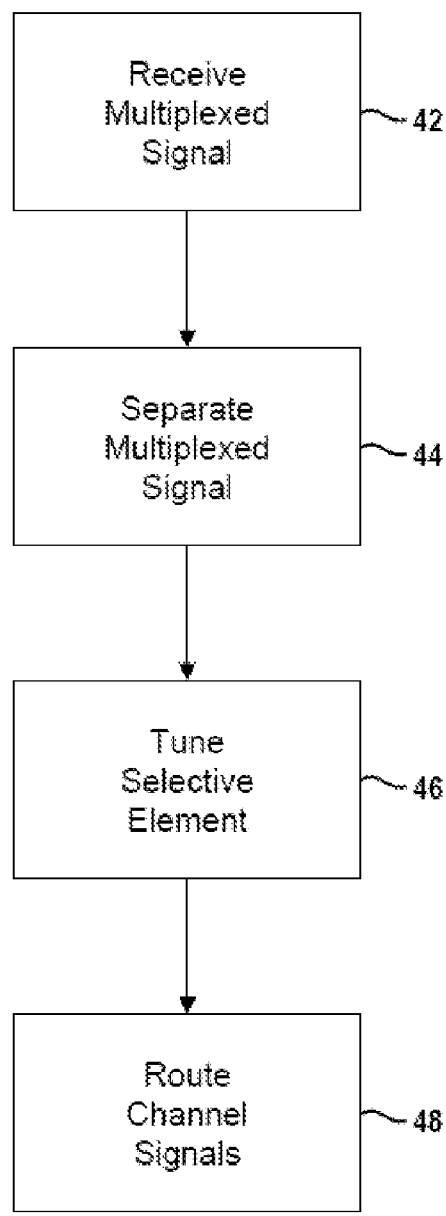
FIG. 4 is a flowchart illustrating the method for routing signal according to the present disclosure.

FIG. 4 illustrates the steps taken to route optical signals in this manner. An optical multiplexed signal having a plurality of wavelength-channels embodied therein is first received at 42 into an optical de-interleaver. The optical multiplexed signal is separated at 44 by the de-interleaver into two or more channel groups, where each channel group has a subset of the wavelength-channels and each channel to be routed in a given channel group is adjacent to a channel that is not in the given channel group. A wavelength selective element is provided for each channel of interest (i.e., can be routed). To route a channel signal of interest, the corresponding wavelength selective element is tuned at 46 to either the channel signal of interest or the "empty" wavelength-region adjacent to the channel signal of interest. In this way, wavelength-channels may be routed 48 without disturbing optical signals on other channels.

In an alternative embodiment, the optical interleaver separates an optical multiplexed signal into two or more channel groups, where each routing signal has pairs of adjacent wavelength-channels and each pair of adjacent wavelength-channels in a given routing signal is adjacent to a channel signal that is not in the given routing signal. Rather than one tunable element per channel, a single tunable element can be used for each channel pair. For instance, tune one direction to choose one channel, tune an opposite direction to choose the other channel and set tuner in between the channels such that neither channel is selected.

Various implementations are contemplated for this concept. In an exemplary embodiment, the de-interleaver is comprised of a Mach-Zehnder interferometer which divides the channels into alternate even-odd sets. Two-by-two couplers used in the interferometer can comprise, for example, evanescent waveguide couplers, multimode interference couples, grating couplers or any compound couplers comprising multiple couplers of one or several of these types. Other constructs for the de-interleaver are also contemplated by this disclosure, including but not limited to one or more lattice filters, one or more binary supergratings, or one or more array waveguide gratings.

Figure 5:
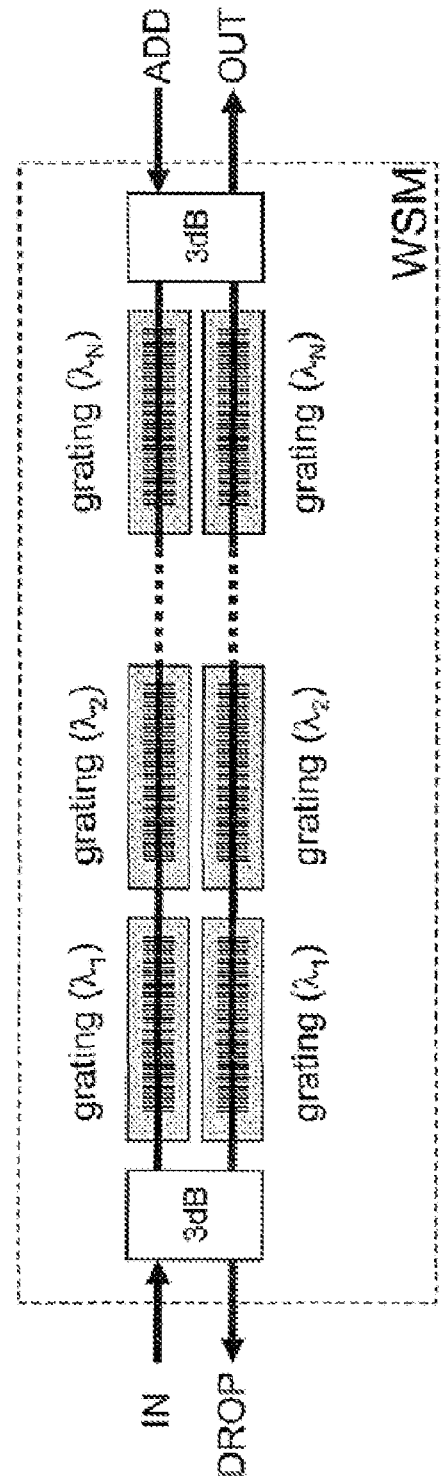
FIG. 5 is a diagram of exemplary tunable gratings in a Mach-Zehnder interferometer.

In this exemplary embodiment, a wavelength selective module may be implemented in the arms of the Mach-Zehnder interferometer as shown in FIG. 5. In this embodiment, each pair of reflective gratings serve as a wavelength selective element. In operation, a signal containing multiple wavelengths entering the device via the IN port will be split equally between the 2 arms of the MZI and recombined at the second 3 dB coupler to exit the OUT port. Reflective gratings are written in the MZI arms so as to reflect particular stop-bands. Each of the gratings has an identical corresponding copy in the other MZI arm so that the reflected signals from both arms recombine at the DROP port. The wavelengths selected by grating-in-MZI wavelength selective element can be modified by tuning the matched pairs of gratings. Tuning can be attained through a variety of methods, including thermo-optic, electro-optic, magneto-optic, mechanical, electromechanical, piezoelectric, liquid-crystal based, electrophoretic and photochromic. For further details regarding this exemplary wavelength selective module, reference may be had to Y. P. Lee and C. H. Henry, "Silica-based optical integrated circuits," *IEE Proc. Optoelectron.*, Vol. 143, no. 3, pp. 263-280 (October 1996). It is readily understood that other types of wavelength selective elements are contemplated by this disclosure The optical routing device of this disclosure is preferably integrated on a photonic lightwave circuit. Such integration makes this device straight-forward and inexpensive to manufacture, because no, labor intensive steps need to be taken from raw material to finished product. Many contravention optical devices require such labor intensive steps like assembly and alignment of optical components.

The following description is merely exemplary in nature and is not intended to limit the present disclosure, application, or uses.

What is claimed is:

1. A method for hitlessly routing optical signals in an optical transport network, comprising:
   separating an incoming optical multiplexed signal having a plurality of wavelength-channels embodied therein into two or more channel groups, where each channel group has a subset of the wavelength-channels and each channel to be routed in a given channel group is adjacent to a channel free region;
   providing a wavelength selective element for each wavelength-channel to be routed; and
   routing a given wavelength-channel by tuning the corresponding wavelength selective element to either the given wavelength-channel or a channel free region adjacent to the given wavelength-channel.

2. The method of claim 1 further comprises receiving wavelength-channels output by one or more of the wavelength selective elements and combining the received wavelength-channels into an outgoing multiplexed signal.

3. The method of claim 1 wherein separating the optical multiplexed signal further comprises interleaving every Nth channel in the multiplexed signal into a different channel group.

4. The method of claim 1 wherein routing a wavelength channel is done using at least one of Bragg gratings, apodized gratings, binary gratings, binary supergratings, array waveguide gratings, Mach-Zehnder interferometers, lattice filters, evanescent waveguide couplers, multi-mode interference couplers, co-directional grating couplers, counter-directional grating couplers and grating-frustrated couplers.

5. The method of claim 1 wherein the separating said incoming optical multiplexed signal is done using at least one of Bragg gratings, apodized gratings, binary gratings, binary supergratings, array waveguide gratings, Mach-Zehnder interferometers, lattice filters, evanescent waveguide couplers, multi-mode interference couplers, co-directional grating couplers, counter-directional grating couplers and grating-frustrated couplers.

6. The method of claim 1 further comprises tuning the wavelength selective element thermo-optically, electro-optically, magneto-optically, acusto-optically, by means of mechanical or electro-mechanical stress, pressure or displacement, or using liquid-crystal, photochromic or dye material effects.

7. The method of claim 1 further comprises integrating the wavelength selective elements on one or more photonic lightwave circuits.

8. The method of claim 1 further comprises sizing the channel free region to receive a stopband of a wavelength selective element without disturbing adjacent channels.

9. A method for hitlessly routing optical signals in an optical transport network, comprising:
   separating an incoming optical multiplexed signal having a plurality of wavelength-channels embodied therein into two or more channel groups by interleaving every Nth channel in the multiplexed signal into a different one of the channel groups, such that each channel is adjacent to a channel free region
   providing a wavelength selective element for each pair of wavelength-channels to be routed hitlessly, where a channel free region disposed between the pair of wavelength-channel is sized to receive a stopband of the wavelength selective element;
   routing a given wavelength-channel by tuning the corresponding wavelength selective element to either the given wavelength-channel or a range of wavelength channels adjacent to the given wavelength-channel and not in the channel group.

10. The method of claim 9 further comprises receiving wavelength-channels output by one or more of the wavelength selective elements and combining the received wavelength-channels into an outgoing multiplexed signal.

11. The method of claim 9 wherein routing a wavelength channel is done using at least one of Bragg gratings, apodized gratings, binary gratings, binary supergratins, array waveguide gratings, Mach-Zehnder interferometers, lattice filters, evanescent waveguide couplers, multi-mode interference couplers, co-directional grating couplers, counter-directional grating couplers and grating-frustrated couplers.

12. The method of claim 9 wherein the separating said incoming optical multiplexed signal is done using at least one of Bragg gratings, apodized gratings, binary gratings, binary supergratings, array waveguide gratings, Mach-Zehnder interferometers, lattice filters, evanescent waveguide couplers, multi-mode interference couplers, co-directional grating couplers, counter-directional grating couplers and grating-frustrated couplers.

13. The method of claim 9 further comprises tuning the wavelength selective element thermo-optically, electro-optically, magneto-optically, acusto-optically, by means of mechanical or electro-mechanical stress, pressure or displacement, or using liquid-crystal, photochromic or dye material effects.

14. The method of claim 9 further comprises integrating the wavelength selective elements on one or more photonic lightwave circuits.

15. A reconfigurable optical routing device, comprising:
   an optical de-interleaver having an input port configured to receive an optical multiplexed signal having a plurality of wavelength-channels embodied therein and operable to separate the optical multiplexed signal into two or more channel groups by interleaving every Nth channel in the multiplexed signal into a different one of the channel groups when the optical multiplexed signal is present at the input port, where each channel group has a subset of the wavelength-channels and each channel to be routed hitlessly in a given channel group is adjacent to a channel that is not in the given channel group; and
   a plurality of wavelength selective elements arranged in series and configured to receive a given channel group from the optical de-interleaver, each wavelength selective element is operable to tune to a given channel of interest contained in the given channel group signal or to a channel free region adjacent to the channel of interest, where the channel free region is sized to receive a stopband of the wavelength selective element without disturbing any other wavelength-channels in the given channel group.

16. The reconfigurable optical routing device of claim 15 wherein a wavelength selective element is provided for each channel to be routed hitlessly.

17. The reconfigurable optical routing device of claim 15 wherein a wavelength selective element is provided for each pair of wavelength-channels to be routed hitlessly.

18. The reconfigurable optical routing device of claim 15 wherein the optical de-interleaver is comprised of at least one of Bragg gratings, apodized gratings, binary gratings, binary supergratings, array waveguide gratings, lattice filters, Mach-Zehnder interferometers, evanescent waveguide couplers, multi-mode interference couplers, co-directional grating couplers, counter-directional grating couplers and grating-frustrated couplers.

19. The reconfigurable optical routing device of claim 15 wherein the wavelength selective elements are comprised of at least one of Bragg gratings, apodized gratings, binary gratings, binary supergratings, array waveguide gratings, lattice filters, Mach-Zehnder interferometers, evanescent waveguide couplers, multi-mode interference couplers, co-directional grating couplers, counter-directional grating couplers and grating-frustrated couplers.

20. The reconfigurable optical routing device of claim 15 wherein the wavelength selective elements are tuned thermo-optically, electro-optically, magneto-optically, acusto-optically, by means of mechanical or electro-mechanical stress, pressure or displacement, or using liquid-crystal, photochromic or dye material effects.

21. The reconfigurable optical routing device of claim 15 wherein the plurality of wavelength selective elements are integrated onto one or more planar lightwave circuits.

22. The reconfigurable optical routing device of claim 15 further comprises an optical interleaver configured to receive wavelength-channels output from one or more of the wavelength selective elements and interleave the wavelength-channels to form an outgoing optical multiplexed signal.

* * * * *